US009305000B1

(12) United States Patent
Bandopadhyay et al.

(10) Patent No.: US 9,305,000 B1
(45) Date of Patent: Apr. 5, 2016

(54) CREATING AND PUBLISHING SERVICE LEVEL REPRESENTATIONS OF APPLICATIONS FROM OPERATIONAL REPRESENTATIONS

(71) Applicant: Symantec Corporation, Mountain View, CA (US)

(72) Inventors: Tushar Bandopadhyay, San Jose, CA (US); Bharat Dighe, Sunnyvale, CA (US)

(73) Assignee: Veritas US IP Holdings LLC, Mountain View, CA (US)

( * ) Notice: Subject to any disclaimer, the term of this patent is extended or adjusted under 35 U.S.C. 154(b) by 182 days.

(21) Appl. No.: 14/227,089

(22) Filed: Mar. 27, 2014

(51) Int. Cl.
G06F 17/30 (2006.01)
(52) U.S. Cl.
CPC .............................. G06F 17/30091 (2013.01)
(58) Field of Classification Search
USPC .......................................................... 707/736
See application file for complete search history.

(56) References Cited

U.S. PATENT DOCUMENTS

| | | | | | |
|---|---|---|---|---|---|
| 6,151,608 | A * | 11/2000 | Abrams | ................. | G06F 17/303 707/679 |
| 7,039,875 | B2 * | 5/2006 | Khalfay | ..................... | G06F 8/38 715/744 |
| 2003/0229593 | A1 * | 12/2003 | Raley | ...................... | G06F 21/10 705/55 |
| 2003/0233330 | A1 * | 12/2003 | Raley | ...................... | G06F 21/10 705/55 |
| 2004/0236717 | A1 * | 11/2004 | Demartini | ............... | G06F 21/10 |
| 2005/0273685 | A1 * | 12/2005 | Sachdev | ................ | G06F 11/263 714/742 |
| 2006/0230083 | A1 * | 10/2006 | Allyn | ................... | G06F 11/3684 |
| 2007/0220462 | A1 * | 9/2007 | Lindberg | ............ | G06F 17/5031 716/108 |
| 2008/0235258 | A1 * | 9/2008 | Chung | ................ | G06F 17/2211 |
| 2009/0282006 | A1 * | 11/2009 | Misvaer | ................. | G06Q 50/18 |
| 2010/0306638 | A1 * | 12/2010 | Oleksy | .................... | G06F 8/315 715/221 |
| 2011/0202635 | A1 * | 8/2011 | Yeung | ................. | H04L 12/1407 709/219 |
| 2013/0283141 | A1 * | 10/2013 | Stevenson | .............. | G06Q 10/10 715/222 |
| 2014/0324501 | A1 * | 10/2014 | Davidow | ........ | G06Q 10/063118 705/7.17 |
| 2014/0325374 | A1 * | 10/2014 | Dabrowski | ............. | G06F 3/048 715/744 |

* cited by examiner

*Primary Examiner* — Cam-Linh Nguyen
(74) *Attorney, Agent, or Firm* — Campbell Stephenson LLP (57) ABSTRACT

Service level representations of applications being made highly available are automatically created and published, based on their operational representations. A repository containing multiple application service templates is maintained. Each application service template defines the attributes of an application type to include in corresponding service level representations. To create a service level representation for a specific application instance, an appropriate application service template is selected from the repository. The attributes of a copy of the selected template are populated with values describing the application instance and its associated resources (including a service identifier), thereby automatically creating a service level representation of the application instance. The attributes can be populated with data read from resources of the operational representation of the application instance. The created service level representation is validated, and published to the application service consumer for which the application is being made highly available.

20 Claims, 4 Drawing Sheets

CREATING AND PUBLISHING SERVICE LEVEL REPRESENTATIONS OF APPLICATIONS FROM OPERATIONAL REPRESENTATIONS

TECHNICAL FIELD

This disclosure pertains generally to providing high availability information technology services, and more specifically to creating and publishing service level representations of applications being made highly available, based on operational representations of the applications and their associated resources.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Clustering systems are often combined with storage management products that provide additional useful features, such as journaling file systems, logical volume management, multipath input/output (I/O) functionality, etc.

In a high-availability clustering system, the failure of a server (or of a specific computing resource used thereby such as a network adapter, storage device, etc.) is detected, and the application that was being run on the failed server is automatically restarted on another computing system. This process is called "failover." The high-availability clustering system can also detect the failure of the application itself, and failover the application to another node. In effect, the high-availability clustering system monitors applications, the servers the applications run on, and the resources used by the applications, to ensure that the applications remain highly available.

Virtualization of computing devices can be employed in high availability clustering and in other contexts. One or more virtual machines (VMs or guests) can be instantiated at a software level on physical computers (host computers or hosts), such that each VM runs its own operating system instance. Just as software applications, including server applications such as databases, enterprise management solutions and e-commerce websites, can be run on physical computers, so too can these applications be run on virtual machines. VMs can be deployed such that applications being monitored by the high-availability clustering system run on and are failed over between VMs, as opposed to physical servers. In order to provide an application with high availability in a cloud environment, the application can be run on a virtual machine which is in turn running on a high-availability cluster. The virtual machine provides the desired mobility and isolation of the application, whereas the underlying high-availability cluster provides the highly available computing infrastructure.

For these reasons, enterprises and other organizations that require high availability for their applications such as databases, enterprise management solutions and e-commerce websites often enter into service level agreements with a high availability cluster provider to host their applications and guarantee a specific level of availability. In these cases, the high-availability cluster provides the underlying infrastructure from which to serve applications to organizational customers over a network (e.g., as a cloud service), where the organizational customer requires high availability of the application, either to make it available to its own customers (e.g., an e-commerce web service) or for internal organizational use (e.g., a critical database application).

At the level of the high-availability cluster, a specific application that is being made highly available to an organizational customer is associated with a logical grouping of associated hardware and software resources and underlying infrastructure. Using an example scenario of an instance of an Oracle database application being made highly available to a given enterprise, the group of high-availability cluster level resources could include the instance of the database application itself and associated code libraries, a given VM the application executes on, a share of the processing resources of the physical host the VM executes on, virtual network resources of the VM which are in turn mapped to underlying physical network resources (e.g., the network card(s) used to export the database application service, one or more IP addresses associated with the network cards, etc.), a database whose table spaces are files, the virtual file system of the VM, a mount point to underlying storage media which may itself be logical or physical (e.g., disk groups on which the data is stored, a logical volume built in the disk group and a file system using the volume), physical storage resources allocated to the application which may be distributed across various physical media and/or sites with various levels of redundancy, additional processing and network infrastructure guaranteed to be available for the application according to the service agreement and the various relationships and dependencies between these components, including protocols for starting, stopping restarting and monitoring the application.

At the level of the high-availability clustering system, such groupings of resources need to be identified, configured and maintained in order to provide specific application services to organizational customers at agreed levels. Such a group of resources can be thought of as a high-availability cluster level operational representation of the application. These operational representations of applications are present in various clustering technologies. Different clustering products use different terminology to refer to such groupings. For example, these operational representations are termed service groups in Veritas Cluster Server, whereas in Microsoft Cluster Server they are called resource groups.

As useful as they are at the high-availability cluster level, such operational representations do not give visibility into the actual service provided by the application, which is how consumers of the application conceive of and interact with it. In other words, consumers of application services (e.g., organizational customers contracting with high-availability cluster providers) do not identify the application by its operational representation, but instead by the service it provides and its connection endpoints. The operational representation of an application does not provide visibility into the actual service provided, which causes disconnect for the consumer in identifying the multiple tiers and components of the provided business service, which is a very critical aspect of information technology management and continuity. Conventionally, these important identifications are made at the IT administrative level manually, and made available at the business service level using listing information such as a service catalog.

It would be desirable to address this issue.

SUMMARY

Service level representations of applications executing on a cluster and being made highly available are automatically created and published, based on cluster level operational representations of the applications and their associated resources. A repository containing multiple application service templates is maintained. An application service template can be created and maintained in the repository for each one of multiple application types for which a corresponding operational representation is available. Each application service template defines the attributes of a type of application to include in corresponding application service level representations. Each template also includes information defining how the attributes of the application service template are to be populated with values representing the specific application instance. For example, the attributes of templates can be populated with data automatically extracted from components of the corresponding operational representation of the application instance.

In order to create a service level representation for a specific instance of an application executing on the cluster and being made highly available, an appropriate application service template is selected from the repository. In some embodiments, each application service template and each operational representation of an application instance contain a key attribute that identifies the application type. In this scenario, the application service template whose key attribute matches that of the operational representation of the application instance is selected to use to create the application service level representation.

The attributes of a copy of the selected template are populated with values describing the specific instance of the application and its associated resources, thereby automatically creating a service level representation of the application instance. One of the attributes is a service identifier which can be used to access and reference the specific instance of the application at a service level. Populating the attributes can take the form of reading values from resources of the operational representation of the specific application instance, and using the read values to fill in the attributes of the copy of the selected template. In some instances, at least some attributes are populated by further using one or more read values to obtain additional information from outside the operational representation which is used to fill in one or more attributes.

The values used to populate the attributes of the created service level representation of the specific instance of the application are validated, for example by ensuring that each value used to populate an attribute of the created service level representation is a legal value for the given attribute type, confirming that all required attributes with been filled in with values, and checking the service identifier to ensure that it is valid.

The created service level representation of the specific instance of the application is published to the application service consumer for which the application is being made highly available, for example in a service log available to the consumer. The consumer can then access the instance of the application executing on the cluster at a service level through the published service identifier.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
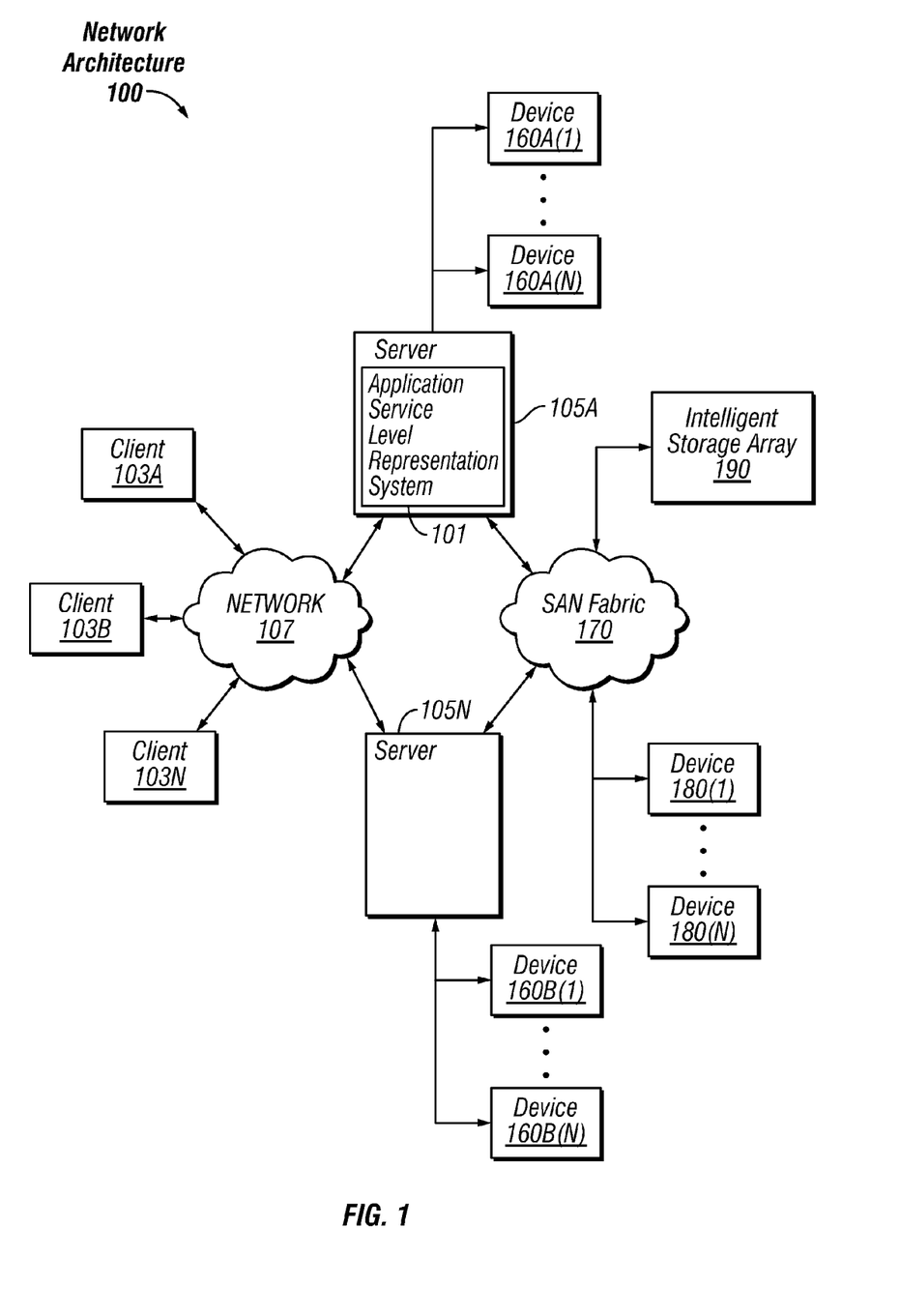
FIG. 1 is a block diagram of an exemplary network architecture in which a application service level representation system can be implemented, according to some embodiments.

FIG. 1 is a block diagram illustrating an exemplary network architecture 100 in which a application service level representation system 101 can be implemented. In the illustrated network architecture 100, client systems 103A, 103B and 103N, as well as servers 105A and 105N, are communicatively coupled to a network 107. A application service level representation system 101 is illustrated as residing on server 105A, but it is to be understood that in different embodiments the application service level representation system 101 can reside on different computers 210, or be distributed between multiple computing systems as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or handheld or wearable mobile computing devices, comprising portable computer systems capable of connecting to a network 107 and running applications.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
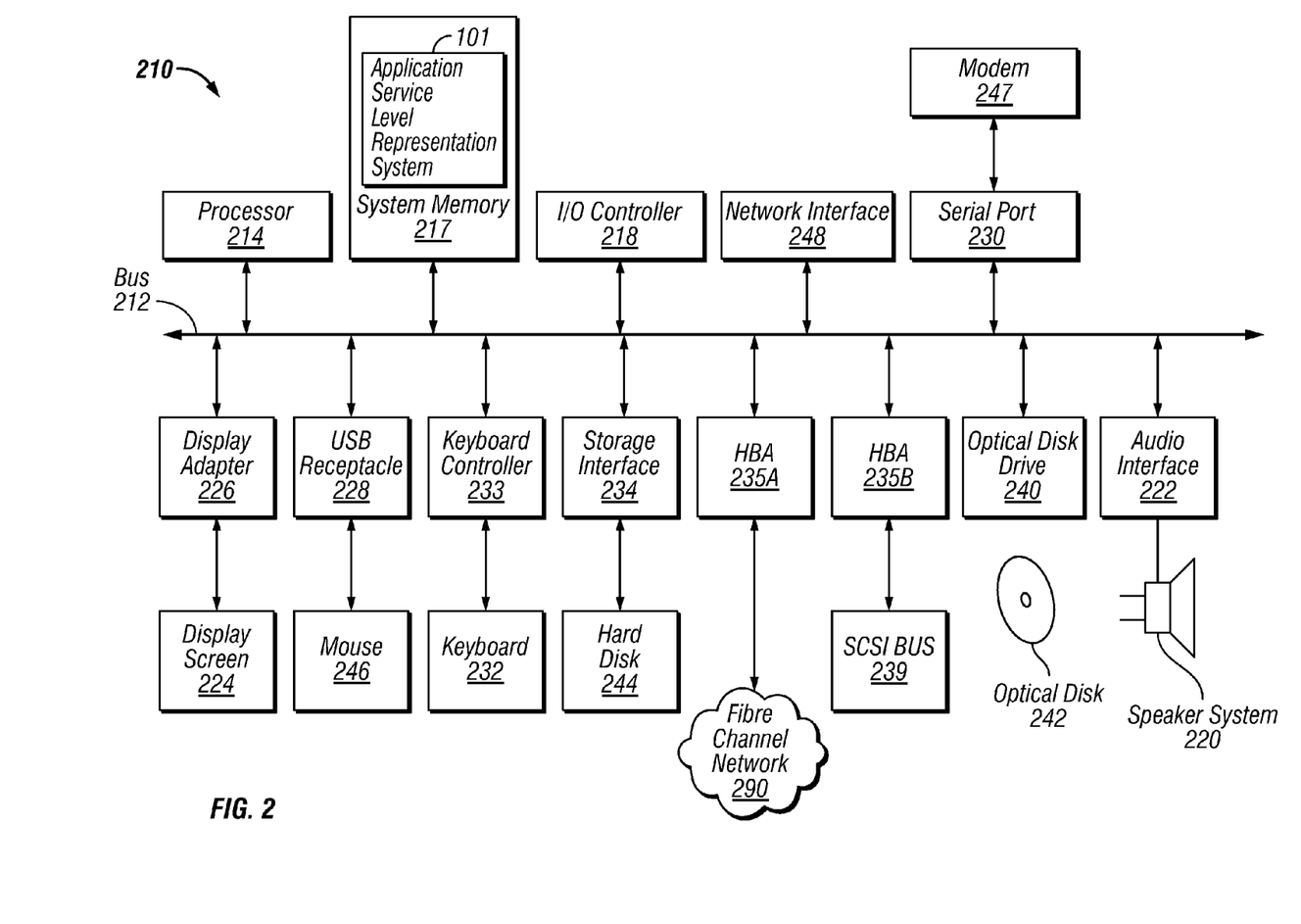
FIG. 2 is a block diagram of a computer system suitable for implementing a application service level representation system, according to some embodiments.

FIG. 2 is a block diagram of a computer system 210 suitable for implementing a application service level representation system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the application service level representation system 101 is illustrated as residing in system memory 217. The workings of the application service level representation system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
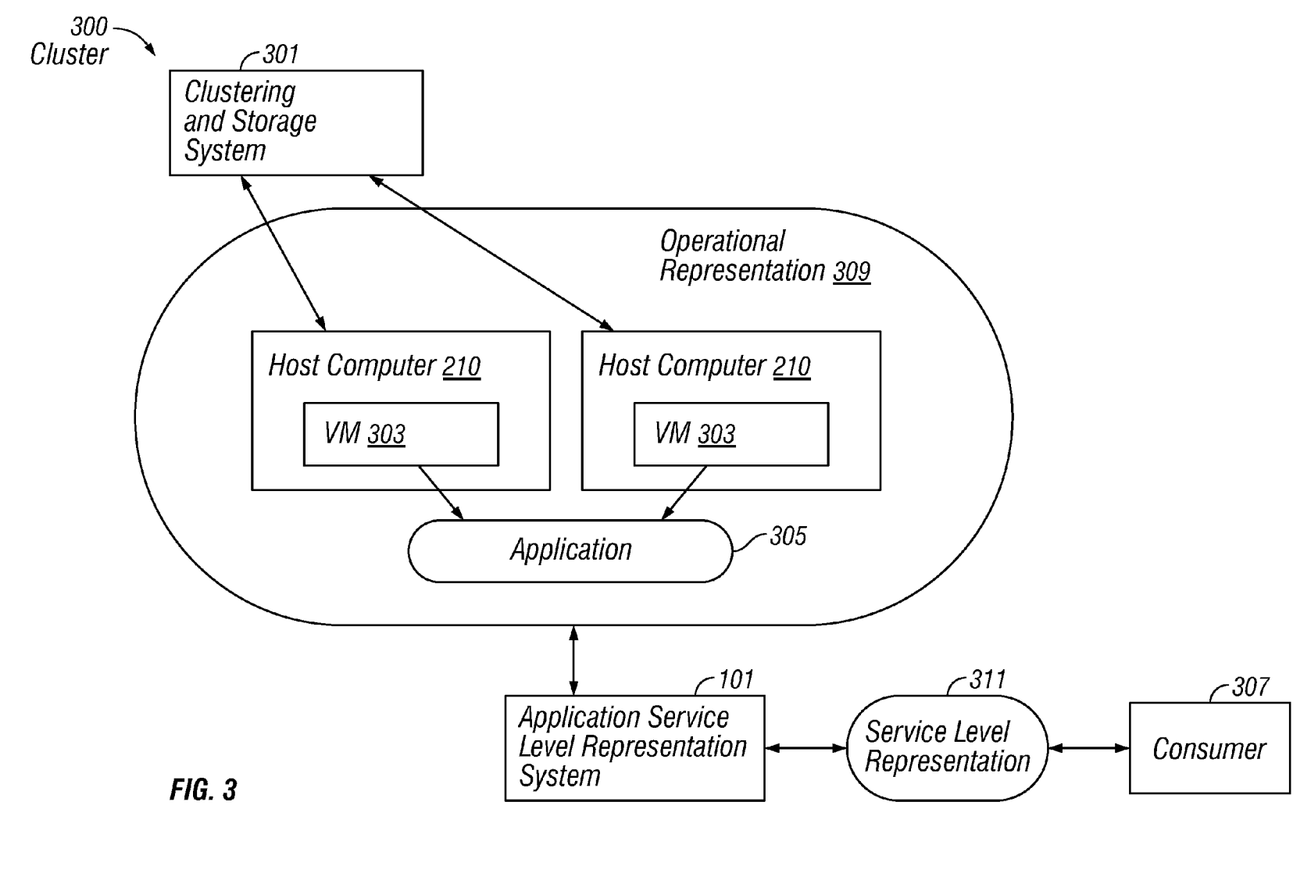
FIG. 3 is a high level block diagram of the operation of a application service level representation system within a high availability cluster, according to some embodiments.

FIG. 3 show a high level overview of the operation of a application service level representation system 101 within a high availability cluster 300, according to some embodiments. FIG. 3 illustrates a cluster 300 instantiated in the context of a high-availability clustering and storage system 301. For efficiency of illustration and explanation, the clustering and storage system 301 is illustrated as a centralized component. It is to be understood that, in practice, the clustering and storage system 301 contains components that are distributed throughout the cluster 300. FIG. 3 illustrates a cluster 300 comprising two host computers 210, each running one VM 303. Although FIG. 3 depicts only two host computers 210 and two VMs 303, it is to be understood that in different embodiments clusters 300 can contain (orders of magnitude) more VMs 303 and physical computer systems 210 as desired.

As illustrated in FIG. 3, a given application 305 (e.g., a database, a web service, etc.) runs on the cluster 300, and is made highly available to a consumer 307. As part of this process, an operational representation 309 of the application 305 is created and maintained by the clustering and storage system 301. In addition, as described in detail below, the application service level representation system 101 extracts service attributes of the application 305 and provides a service level representation 311 of the application 305 to its consumer 307 (e.g., the enterprise or organization for which the application 305 is being provided at high availability). Thus, in addition to representing the application 305 from an operational perspective, e.g., how it is started, stopped and monitored, and what resources it uses, the application service level representation system 101 enables the application 301 to be represented based on how its consumers 307 actually use it, which is according to the service it provides. As described in detail below, the application service level representation system 101 creates this service level representation 311 of the application 305, and publishes the service level representation 311 to the consumer 307. This helps the consumer 307 tremendously in identifying applications 305 at different tiers (e.g., web server, application, database), and hence in the construction and maintenance of multi-tier IT business services.

FIG. 3 illustrates the application service level representation system 101 as a centralized component. It is to be understood that in different embodiments, the functionalities of the application service level representation system 101 can reside on a server 105, client 103, or be distributed between multiple computer systems 210 across the cluster 300, including within a cloud-based computing environment in which the functionality of the application service level representation system 101 is provided as a service over a network 107. It is to be understood that although a application service level representation system 101 is illustrated in FIG. 3 as a single entity, the illustrated application service level representation system 101 represents a collection of functionalities, which can be instantiated as a single or multiple modules as desired. It is to be understood that the modules of the application service level representation system 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the application service level representation system 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

Figure 4:
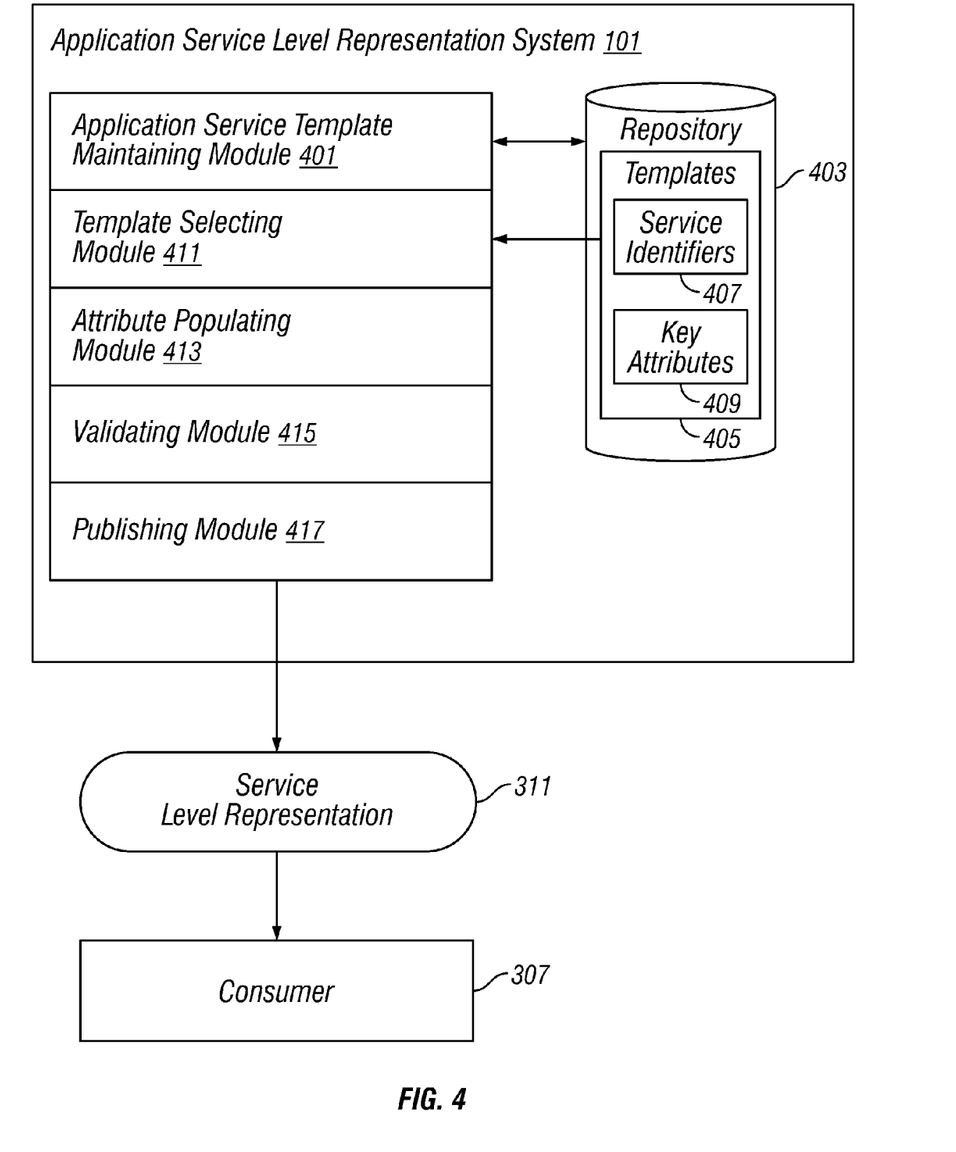
FIG. 4 is a block diagram of the functional modules of a application service level representation system, according to some embodiments.

FIG. 4 shows the operation of the functional modules of the application service level representation system 101, according to some embodiments. As illustrated, an application service template maintaining module 401 creates and maintains a repository 403 of application service templates 405. An application service template 405 defines the attributes which are to be exposed to an application service consumer 307 for a specific type (or other level) of application 305, including both attributes of the application 305 itself and those of its associated resources. A separate application service template 405 can be created for each widely used application type for which an operational representation 309 is available, such as database, web server, application server, etc. Note that application service templates 405 can be created at varying levels of granularity as desired, such as for a specific kind of application (e.g., database), a specific make of application (e.g., Oracle RDBMS), a specific version (e.g., Oracle Database 12c Release 1: 12.1.0.2.0), etc. In general, an application service template 405 defines the attributes that when exposed to the consumer 307 provide a service level representation 309 of the application 305. The specific attributes to include in each separate template 405 vary depending upon the level at which the template 405 is defined, as well as the specific kind of application, make, version, etc. Note that although an application service template 405 defines the application attributes to be exposed to the application service consumer 307, when a template 405 is created these attributes are not typically populated with specific values, although in some embodiments some or all attributes of given templates 405 can be initialized to default values upon creation.

A service application template 405 further includes information (e.g., instructions or methods) defining how the attributes are to be populated with actual values when a blank application service template 405 is filled with data to represent a specific instance of an application 305. Typically, the values used to populate the attributes of a stock template to create a service level representation 311 of a specific instance of an application 305 can be extracted from the corresponding operational representation 309, or can be discovered based on components of the operational representation 309. In other embodiments, attributes can be populated in other ways (e.g., as regular expression functions of other attributes, from a configuration file or environment variable, via user input, with default values, etc.). The process of populating a service application template 405 to create a service level representation 311 of a specific instance of an application and publishing it to an application service consumer 307 is discussed in more detail below.

Although the specific attributes that are included in application service templates 405 can vary between application types and embodiments, for each application service template 405, a so-called key attribute 409 is defined, which functions as a key that identifies the kind, make, version or other level of application 305 to which the template 405 is applicable. As described in detail below, the key attribute 409 corresponding to a given application 405 can also be gleaned from a specific instance thereof, or from another resource in its operational representation 309. Thus, the key attribute 409 can be used to match operational representations 309 of specific application 305 instances to the corresponding blank application service template 405 to use to create a corresponding application service level representation 311. Note that this matching can go in either direction, i.e., using the key attribute 409 discernible from an operational representation 309 to identify a corresponding application service template 405 to use to create an application service representation 311, and using the key attribute 409 in an application service template 405 to identify operational representations 309 of instances of the corresponding application 301 type in the cluster 300. The use of this matching functionality is described in detail below.

Another attribute that is present in each application service template 405 is a service identifier 407. In this context, a service identifier 407 is a logical representation by which an application 305 can be accessed and referred to in its native environment. For example, a database is typically known by its Open Database Connectivity (ODBC) string. (ODBC is a standard programming language middleware API for accessing database management systems (DBMS), and an ODBC string is a string version of the initialization properties needed to connect to an OBDC compliant data store.) A service identifier typically contains not only information exposed by the application 305, but also by its supporting infrastructure (e.g., virtual IP address, virtual hostname, etc.). Thus, the service identifier 407 for a specific instance of an application 305 is included in the corresponding application service template 405 and thereby exposed to the application service consumer 307 as part of the service level representation 311 of an instance of an application 305.

The exact format of the service identifier 407 varies between application type and embodiment. For example, for an application service template 405 for a web service, the service identifier 407 could take the form: "http://<VIRTUAL_HOST>:<PORT>/<APPINSTANCE>/api" where VIRTUAL_HOST, PORT and APPINSTANCE are other attributes of the service application template 405. Similarly, for an application service template 405 for a database, the service identifier can be the ODBC string as described above, for example in the form: "jdbc:<KEY>:thin:@<VIRTUAL_HOST>:<PORT>:<INSTANCE>".

As noted above, default application service templates 405 can be supplied by the application service level representation system 101. In some embodiments, users of the application service level representation system 101 (e.g., administrators or the like) can also edit default application service templates 405 and/or create customized ones for use under specific scenarios as desired. New application service templates 405 can be created to correspond to new applications 305 (or types, versions or other levels thereof). In some embodiments, the creation and/or editing of some or all application service templates 305 can be crowd sourced. In any case, the template maintaining module 401 maintains a repository 403 of multiple application service templates 405, each one corresponding to a different kind, make, version or other level of application type. The template repository 403 can be instantiated in the form of a database or other suitable storage mechanism that can be used to store, maintain and access the plurality of templates 405.

In order to create an application service representation 311 of a specific instance of an application 305 based on its operational representation 307, a template selecting module 411 of the application service level representation system 101 examines the given operational representation 309, and identifies its application instance 301. From the instance of the application 301 of the specific operational representation 309, the template selecting module 411 further gleans the key attribute 409, which, as described above, maps the instance of the application 305 to the specific application service template 405 corresponding to applications 305 of that kind, make, version, or other level of granularity. The template selecting module 411 then selects the template 405 with the same key attribute 409 as the application instance from the repository 403, as the template to be used in order to create the application service level representation 311.

Once the proper application service template 405 has been selected, an attribute populating module 413 of the application service level representation system 101 makes a copy of the template 405 and populates its attributes with actual values describing the specific application instance and its associated resources. Typically, the attribute populating module 413 can fill in most of the attributes of the selected template 405 with values read from specific resources of the corresponding operational representation 309. In some cases, an attribute of the template 405 (i.e., an attribute to be exposed to the application service consumer 307) is not in a resource of the operational representation 309 per se, but an attribute of the operational representation can be used to obtain the information (e.g., a port number). In some cases, configuration files, user interaction or other operations are utilized to obtain data to populate certain attributes of some application service templates 405. Note that as part of the process of populating the attributes of the template 405, the attribute populating module 413 builds the service identifier 407 for the specific application instance, which, depending upon the specific format used for the service identifier 407, typically involves using values of other populated attributes (e.g., VIRTUAL_HOST, PORT and APPINSTANCE).

It is to be understood that an application service template 405 which has had its attributes populated with specific values including the creation of a service identifier 407 is an application service level representation 311 of the corresponding application instance which can be published and thus exposed to the service consumer 307, as described below. Therefore, once the attributes of an application service template 405 have been populated with specific data values but before publication, a validating module 415 of the application service level representation system 101 validates the newly created application service representation 311. The validation of a new application service representation 311 involves ensuring the values used to populate the attributes of the template 405 are legal values for the attribute types (e.g., data used to populate attributes is of the expected type and format, and comprises valid content for its context). Additionally, the validating module 415 can ensure that any required attributes in the template 405 have been filled in (i.e., not left blank). The service identifier 407 is also checked, and confirmed to be valid. The exact degree of validation performed can vary between embodiments as desired.

Once an application service representation 311 of an application 305 has been successfully validated, a publishing module 417 of the application service level representation system 101 publishes the application service representation 311 to the consumer 307, either internally within a management framework or externally to a service catalog (not illustrated). Either way, the application service consumer 307 can reference the instance of the application 305 through the service identifier 407, which is transparently associated with all of the attributes of the application service level representation 311 of the application 305. This is highly beneficial to the consumer, which can now access the instance of the application 305 and its exposed attributes at an application service level, via its service identifier 407. This enables the consumer 307 to access the application 305 at the level at which it used, and eliminates the labor intensive manual administration involved with conventional publication of served applications 305.

Conventionally, the consumer would have to request creation of an operation representation 309, typically through some administrator who interfaces between the cluster provider and the party responsible for the application 305 on the consumer side. The administrator in the middle would request the creation of the operational representation 309 of the application 305, and a cluster level administrator would create the operational representation 309 which was referenced by an operational representation identifier (e.g., a service group id). Using the operational representation identifier, the middle level administrator would manually identify the attributes to be exposed to the consumer 307, often needing to actively track down information not contained in the operational representation 309 itself. The middle level administrator would then construct a service identifier 307 and manually publish it, e.g., in a service catalog.

Using the functionality described above, the application service level representation system 101 can automatically create, validate and publish application service level representations 311 of applications 305. In some embodiments, whenever an operational representation 309 of an instance of application 305 and its associated resources is created by the high-availability clustering and storage system 301, the application service level representation system 101 automatically creates, validates and publishes a corresponding application service representation 311. In other embodiments, this can be done selectively, for example only for certain types of applications 305 or for specific application service consumers 307 as desired. In some embodiments, an application service level representation 311 of an application 305 is automatically created using the functionality described above in response to a directive from a user (e.g., an administrator operating a user interface).

In some embodiments, for example if an application service level representation system 101 is deployed in an existing cluster 300 which already contains operational representations 309 of application instances, the application service level representation system 101 can identify all (or certain ones) of the operational representations 309 in the cluster 300, identify their underlying application 305 instances, glean the corresponding key attributes 409 and select the matching application service templates 405, which can then be used to create and publish an application service level representation 311 as described above. This process can also be performed by starting with the application service templates 405 of the repository 403, and using the key attribute 409 of each template 405 to identify any operational representations 309 of corresponding applications 305 in the cluster 300 that lack application service representations 311. The above described functionality can then be used to create and publish the corresponding application service representations 311 as desired. Note that, this is operational representation and failover cluster technology agnostic and is not limited to any specific product.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically creating application service level representations of applications executing on a cluster and being made highly available, based on cluster level operational representations of the applications and their associated resources, the method comprising the steps of:
   maintaining, by a computer, a repository of multiple application service templates, wherein each application service template defines attributes of an application type to include in corresponding application service level representations, and information defining how the attributes of the application service template are to be populated with values to represent a specific instance of an application of the application type at a service level;
   for a specific instance of an application executing on the cluster and being made highly available, selecting, by the computer, an application service template from the repository to use to create a corresponding application service level representation;
   populating, by the computer, the attributes of a copy of the selected application service template with values describing the specific instance of the application and its associated resources, thereby automatically creating a service level representation of the specific instance of the application, wherein the populating the attributes further comprises assigning a value to a service identifier which can be used to access and reference the specific instance of the application at the service level;
   validating, by the computer, the values used to populate the attributes of the service level representation created for the specific instance of the application; and
   publishing, by the computer, the service level representation created for the specific instance of the application to an application service consumer for which the application is being made highly available, wherein the application service consumer can access the specific instance of the application executing on the cluster at the service level through the service identifier.

2. The method of claim 1 further comprising:
   creating a corresponding application service template for each one of a plurality of application types for which a corresponding cluster level operational representation is available.

3. The method of claim 1 wherein:
   information defining how the attributes of at least one specific application service template are to be populated with values describes automatically extracting data from components of a corresponding cluster level operational representation.

4. The method of claim 1 wherein:
   the each application service template and each cluster level operational representation of an instance of an application executing on the cluster contain a key attribute that identifies a type of application; and
   wherein the selecting the application service template for the specific instance of the application executing on the cluster to use to create the corresponding application service level representation further comprises: selecting an application service template with a key attribute that matches a key attribute of the cluster level operational representation of the specific instance of the application.

5. The method of claim 1 wherein the populating the attributes of the copy of the selected application service template with values describing the specific instance of the application and its associated resources further comprises:
   reading values from resources of a cluster level operational representation of the specific instance of the application executing on the cluster; and
   using the values read from resources of the cluster level operational representation to fill in the attributes of the copy of the selected application service template.

6. The method of claim 1 wherein the populating the attributes of the copy of the selected application service template with values describing the specific instance of the application and its associated resources further comprises:
   reading values from resources of a cluster level operational representation of the specific instance of the application executing on the cluster;
   using a value read from a resource of the cluster level operational representation to obtain additional information from outside the cluster level operational representation; and
   using the additional information obtained to fill in at least one attribute of the copy of the selected application service template.

7. The method of claim 1 wherein the validating the values used to populate the attributes of the service level representation created for the specific instance of the application further comprises:
   ensuring that each value used to populate the attribute of the service level representation created is a legal value for an attribute of a given type.

8. The method of claim 1 wherein validating the values used to populate the attributes of the service level representation created for the specific instance of the application further comprises:
   ensuring that each required attribute of the service level representation created has been filled in with a value.

9. The method of claim 1 wherein the validating the values used to populate the attributes of the service level representation created for the specific instance of the application further comprises:
   checking the service identifier of the service level representation created; and
   ensuring that the service identifier of the service level representation created is valid.

10. The method of claim 1 wherein the publishing the service level representation created for the specific instance of the application to the application service consumer further comprises:
    publishing the service level representation in a service catalog available to the application service consumer.

11. At least one non-transitory computer readable medium for automatically creating application service level representations of applications executing on a cluster and being made highly available, based on cluster level operational representations of the applications and their associated resources, the at least one non-transitory computer readable medium storing computer executable instructions that, when loaded into computer memory and executed by at least one processor of a computing device, cause the computing device to perform the following steps:
    maintaining a repository of multiple application service templates, wherein each application service template defines attributes of an application type to include in corresponding application service level representations, and information defining how the attributes of the application service template are to be populated with values to represent a specific instance of an application of the application type at a service level;

for a specific instance of an application executing on the cluster and being made highly available, selecting an application service template from the repository to use to create a corresponding application service level representation;

populating the attributes of a copy of the selected application service template with values describing the specific instance of the application and its associated resources, thereby automatically creating a service level representation of the specific instance of the application, wherein the populating the attributes further comprises assigning a value to a service identifier which can be used to access and reference the specific instance of the application at the service level;

validating the values used to populate the attributes of the service level representation created for the specific instance of the application; and publishing the service level representation created for the specific instance of the application to an application service consumer for which the application is being made highly available, wherein the application service consumer can access the specific instance of the application executing on the cluster at the service level through the service identifier.

12. The at least one non-transitory computer readable medium of claim 11 further comprising stored computer executable instructions that, when loaded into computer memory and executed by the at least one processor of the computing device, cause the computing device to perform the following additional step:

creating a corresponding application service template for each one of a plurality of application types for which a corresponding cluster level operational representation is available.

13. The at least one non-transitory computer readable medium of claim 11 wherein:

information defining how the attributes of at least one specific application service template are to be populated with values describes automatically extracting data from components of a corresponding cluster level operational representation.

14. The at least one non-transitory computer readable medium of claim 11 wherein:

the each application service template and each cluster level operational representation of an instance of an application executing on the cluster contain a key attribute that identifies a type of application; and wherein the selecting the application service template for the specific instance of the application executing on the cluster to use to create the corresponding application service level representation further comprises: selecting an application service template with a key attribute that matches a key attribute of the cluster level operational representation of the specific instance of the application.

15. The at least one non-transitory computer readable medium of claim 11 wherein the populating the attributes of the copy of the selected application service template with values describing the specific instance of the application and its associated resources further comprises:

reading values from resources of a cluster level operational representation of the specific instance of the application executing on the cluster; and using the values read from resources of the cluster level operational representation to fill in the attributes of the copy of the selected application service template.

16. The at least one non-transitory computer readable medium of claim 11 wherein the populating the attributes of the copy of the selected application service template with values describing the specific instance of the application and its associated resources further comprises:

reading values from resources of a cluster level operational representation of the specific instance of the application executing on the cluster;

using a value read from a resource of the cluster level operational representation to obtain additional information from outside the cluster level operational representation; and using the additional information obtained to fill in at least one attribute of the copy of the selected application service template.

17. The at least one non-transitory computer readable medium of claim 11 wherein the validating the values used to populate the attributes of the service level representation created for the specific instance of the application further comprises:

ensuring that each value used to populate an attribute of the service level representation created is a legal value for an attribute of a given type.

18. The at least one non-transitory computer readable medium of claim 11 wherein the validating the values used to populate the attributes of the service level representation created for the specific instance of the application further comprises:

checking the service identifier of the service level representation created; and ensuring that the service identifier of the service level representation created is valid.

19. The at least one non-transitory computer readable medium of claim 11 wherein the publishing the service level representation created for the specific instance of the application to the application service consumer further comprises:

publishing the service level representation in a service catalog available to the application service consumer.

20. A computer system for automatically creating application service level representations of applications executing on a cluster and being made highly available, based on cluster level operational representations of the applications and their associated resources, the computer system comprising:

a processor;

system memory;

an application service template maintaining module residing in the system memory, the application service template maintaining module being programmed to maintain a repository of multiple application service templates, wherein each application service template defines attributes of an application type to include in corresponding application service level representations, and information defining how the attributes of the application service template are to be populated with values to represent a specific instance of an application of the application type at a service level;

a template selecting module residing in the system memory, the template selecting module being programmed to select, for a specific instance of an application executing on the cluster and being made highly available, an application service template from the repository to use to create a corresponding application service level representation;

an attribute populating module residing in the system memory, the attribute populating module being programmed to populate the attributes of a copy of the selected application service template with values describing the specific instance of the application and its associated resources, thereby automatically creating a service level representation of the specific instance of the application, wherein the populating the attributes further comprises assigning a value to a service identifier which can be used to access and reference the specific instance of the application at the service level;

a validating module residing in the system memory, the validating module being programmed to validate the values used to populate the attributes of the service level representation created for the specific instance of the application; and a publishing module residing in the system memory, the publishing module being programmed to publish the service level representation created for the specific instance of the application to an application service consumer for which the application is being made highly available, wherein the consumer can access the specific instance of the application executing on the cluster at the service level through the service identifier.

* * * * *